United States Patent [19]

Stäbler

[11] 4,164,386

[45] Aug. 14, 1979

[54] APPARATUS FOR PRODUCING SHEET MATERIAL

[75] Inventor: Gerhard Stäbler, Murr Kreis Ludwigsburg, Fed. Rep. of Germany

[73] Assignee: Sandvik Conveyor GmbH, Fellbach, Fed. Rep. of Germany

[21] Appl. No.: 916,542

[22] Filed: Jun. 19, 1978

[30] Foreign Application Priority Data

Jul. 2, 1977 [DE] Fed. Rep. of Germany ....... 2729938

[51] Int. Cl.$^2$ .................................... B29C 3/00

[52] U.S. Cl. .................................... 425/371; 425/141

[58] Field of Search .................... 425/371, 369, 141

[56] References Cited

U.S. PATENT DOCUMENTS

| | | | |
|---|---|---|---|
| 3,795,470 | 3/1974 | DeMets | 425/371 |
| 3,837,774 | 9/1974 | Ross et al. | 425/371 X |
| 3,881,852 | 5/1975 | Ahrweiler | 425/371 X |
| 3,926,542 | 12/1975 | Ahrweiler | 425/371 X |
| 3,945,789 | 3/1976 | Boman | 425/371 |

*Primary Examiner*—J. Howard Flint, Jr.
*Attorney, Agent, or Firm*—Harold L. Stults

[57] ABSTRACT

A press for producing continuous sheets, for example, that which is fabricated into circuit boards for printed electrical circuits. There are two endless steel belts, each of which is mounted on a pair of drums or rolls which support the belts so that there are coextensive belt runs which define a treatment zone in which the product is formed. The coextensive belt runs are held in precisely spaced relationship by a pair of pressure plates which may also act as heating plates. Each of the pressure plates is supported from the press structural members by a plurality of support strips which are positioned in rows longitudinally of the treatment zone. The strips of one of those rows adjacent each of the longitudinal side edges of the treatment zone are wedge units. Each wedge unit is adjustable to flex the edge of the support plate and change the thickness of the press-gap in that area. In that way, it is possible to produce a product having precisely controlled uniform thickness throughout.

7 Claims, 4 Drawing Figures

APPARATUS FOR PRODUCING SHEET MATERIAL

This invention relates to twin-belt presses in which a treatment zone is formed by two steel belts which have coextensive belt runs which move together. The belts are held in predetermined spaced relationship by pressure plates which are supported by structural members of the upper and lower sections of the press.

Twin-belt presses of this type are known, for example, in published German Pat. application No. 22 42 399. In the prior presses, the endless belts with the material being treated between them, are supported throughout the treatment zone by roller chains on pressure plates which, in turn, are supported on double T-girders of the lower and upper press sections, respectively. The pressure plates may also be heating or cooling plates. With those prior presses, there tends to be deformation of the pressure plate along the cross-section of the press which can cause the material being pressed to become non-uniform in cross-section. Such deformations can be caused by the high pressures exerted on the pressure plates, or by variations in the press cross-section during manufacturing. As a result, localized variations may occur in the cross-sectional thickness of the product being produced. That problem has caused difficulties during the use of twin-belt presses of this type for manufacturing materials whose thickness must be maintained with precision. For example, in the manufacture of continuous sheets to be fabricated into plastic circuit boards for printed electric circuits, it is very important that a particular thickness be maintained. It has been found that the prior twin-belt presses produce unacceptable variations in the "thickness dimensions" of the press-gap, i.e., at right angles to the direct of belt travel and width. In particular, the sheet thickness in the edge regions where the counter-pressure of the sheet is reduced, usually is less than at the longitudinal center of the sheet. While such thickness variations may be but a fraction of a millimeter, for example, from 0.1 to 0.3 millimeter depending on the method of processing and on the material, thickness variations of that order stand in the way of the use of the prior twin-belt presses in the manufacture of products of the type mentioned above.

It is the object of the present invention to construct a twin-belt press in such a way that localized deformation of the pressure plates, which produce a non-uniform thickness in the sheet product, can be compensated for so that the press-gap and the product are of a thickness which is within acceptable limits throughout its entire cross-section.

In accordance with the present invention, as it relates to twin-belt presses of the type referred to above, the lower section of the press is provided with rows of movable support strips adjacent the side edges of the treatment zone with each support strip being the movable component of a wedge unit. In the illustrative embodiment, each of the movable support strips is positioned on a ramp surface on the press frame which extends inwardly relative to one edge of the support plate, and the pressure plate is supported by those support strips, aided by a center row of stationary support strips which are beneath the longitudinal center area of the belts. When the movable support strips are moved away from one edge of the support plate, that support plate edge is forced upwardly. The wedge angle is very small so that precise control is provided for the vertical position of that edge portion. Hence, the thickness dimension at the edges of the pressgap can be adjusted relative to that dimension at the center to produce products of precisely controlled thickness throughout.

It has been found to be satisfactory to provide a plurality of support strips in a row in the direction of belt travel; and two, three, four or more such rows may be provided. Practical experience has shown that rather good adjustment is possible with only two parallel rows of the movable support strips at the opposite edge regions of the pressure plate and with a fixed support strip intermediate them. The pressure plates are then supported in three zones, when viewed along a cross-section, and the two outer zones can be slightly adjusted to provide the desired height adjustment of the plate edge portions.

The movable support strips may be provided with bearing portions machined exactly to a desired wedge profile which are interconnected by intermediate portions which do not contact the structural members of the press frame or the pressure plate. Each support strip is advantageously provided with two positioning spindles whose positioning movements are preferably coordinated so as to provide a smooth movement of the support strips.

Referring now to the drawings which show an illustrative embodiment of the invention:

Figure 1:
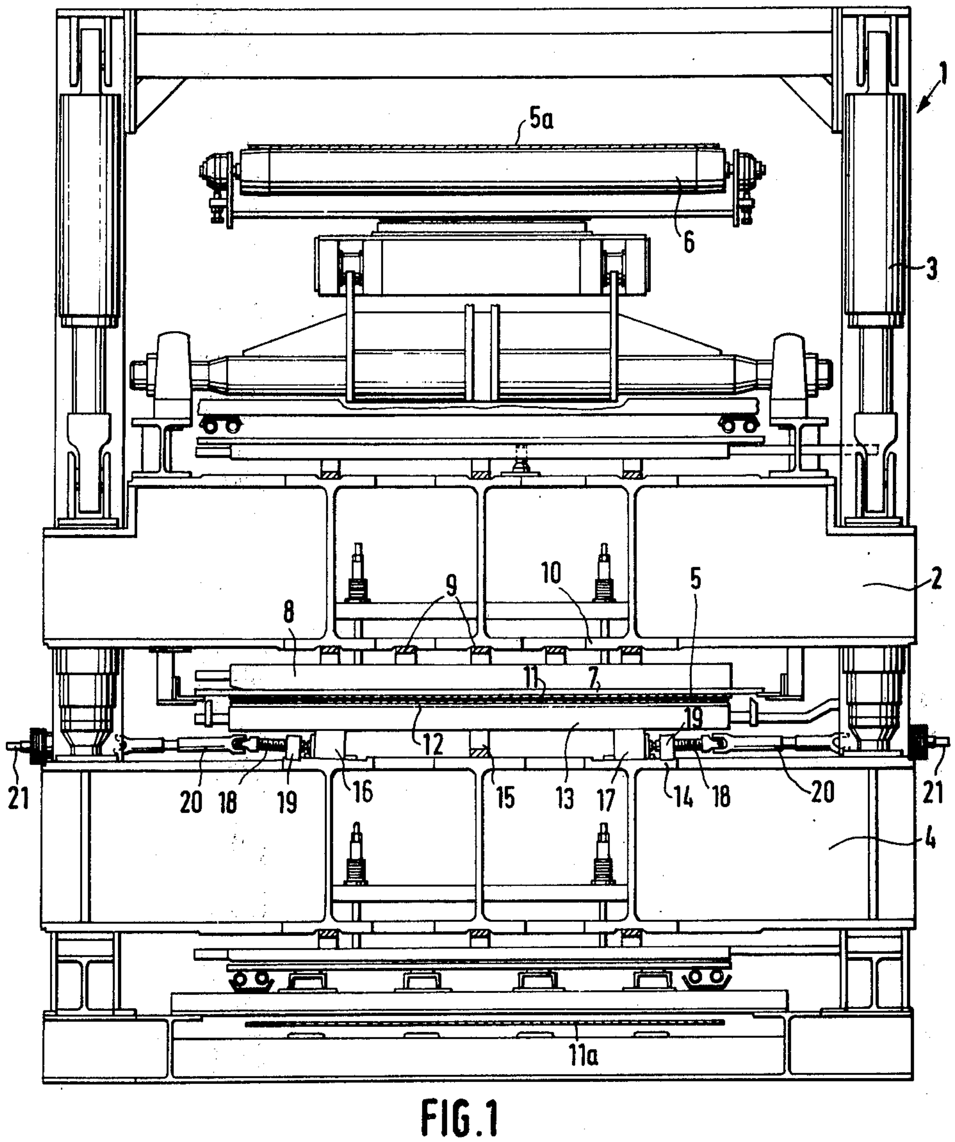
FIG. 1 is a transverse vertical section of a twin-belt press constructed in accordance with the invention.

Referring to FIG. 1 of the drawings, a press 1 has a bottom press frame 4, an upper press frame 2, and a plurality of hydraulic cylinder units 3 along each side of the press which provide support for the upper press frame and associated structure. Positioned within the press are an upper endless steel belt 5 and a lower endless steel belt 11, with each belt being mounted upon a pair of end drums (not shown) to provide coextensive belt runs between the press frames which provide a horizontal material treatment zone between them. That belt run of belt 5 is supported throughout the treatment zone by a continuous array of rollers 7 which are coupled together to form a roller chain and are supported by the flat bottom surface of a pressure plate 8. Pressure plate 8 is rigidly positioned against a plurality of fixed spacer bars 9 which are supported against frame member 10 of press frame 2. The upper run of the lower belt 11 is supported through the treatment zone by a continuous array of rollers 12 which are coupled together to form a roller chain, and the rollers are positioned upon a bottom pressure plate 13. Pressure plate 13 is supported upon the bottom press frame 4 by a row of stationary support strips 15 extending beneath the central axis of the belts and two rows of movable support strips 16 and 17 near the respective edges of the treatment zone, with all of the rows of support strips extending longitudinally through the treatment zone.

Therefore, a fixed stationary relationship is provided for the structure in the top portion and the bottom central portion of the treatment zone by a fixed upper pressure plate 8 and the row of fixed pressure plates resting upon the central longitudinal portion of the lower pressure plate 13, which is rigidly supported by the lower press frame 4. However, the edge portions of the lower pressure plate 13 are supported by the movable support strips 16 and 17, respectively, and those movable support strips provide for adjustment of the vertical position of the edge portions of pressure plate 13.

Figure 2:
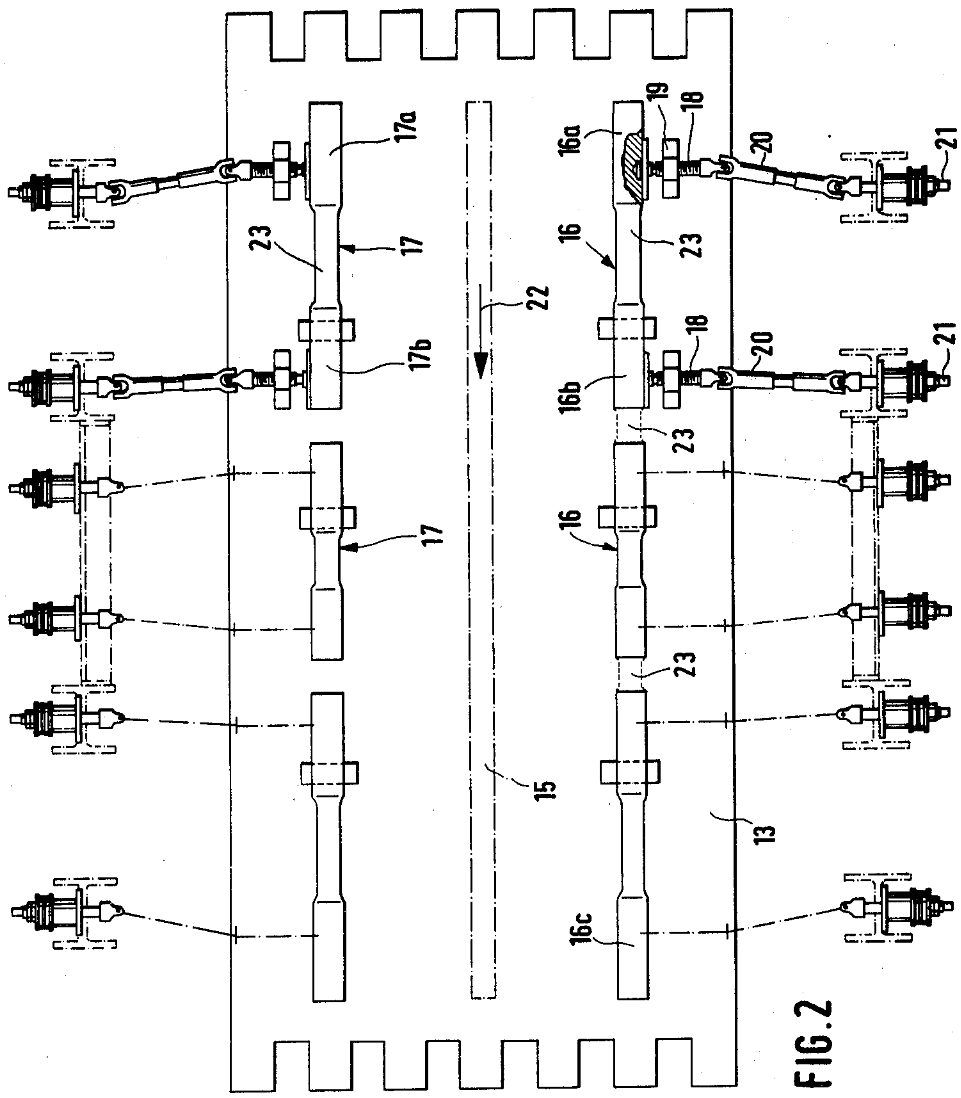
FIG. 2 is a bottom plan view on the line 2—2 of FIG. 1.

Movable support strips 16 and 17 are identical in construction and operation. As shown in FIG. 2, each of the movable support strips has two wedge portions 16*a* and 16*b* (or 17*a* and 17*b*) which are interconnected by a connector portion 23 of reduced cross-section. Attached to each of the wedge portions is a spindle assembly which includes a threaded shaft 18 (see FIG. 3) which is threaded in a bracket 19 bolted to the lower press frame 14. The extreme end of shaft 18 has a reduced end portion which extends through a bore in a bracket 32 fixed to the support strip. A stud bolt is threaded axially into the end of shaft 18 and the enlarged end of the shaft provides flanges 31 which hold bracket 32 between them so as to couple the shaft rotatably to the bracket and through it to the support strip. Hence, when shaft 18 is turned, it screws horizontally through bracket 19 and flanges 31 transmit the resulting axial movement to support strip 17.

As indicated above, the top surface of the press table 14 is cut away to provide a ramp surface which is indicated at 26 and is at an angle of 2° to the horizontal, and the bottom surface 29 of the support strip is also at that angle to the horizontal. The top surface 30 of support strip 17 and the horizontal bottom surface 28 of lower pressure plate 13 rests upon surface 30 of support strip 17. Hence, when shaft 18 is turned, the threaded relationship with bracket 19 causes the shaft to move support strip 17 along surfaces 26 and 28. The mating angular relationships between the support strip and surfaces 29 and 30 insure that the support strip will move smoothly. When the support strip moves to the left toward the center of the treatment zone, pressure strip 17 moves down the ramp surface 26 and the pressure plate 13 is therefore moved downwardly.

Referring again to FIG. 2, the bottom pressure plate 13 is shown in outline and along the center the dotted lines indicate the position of the center support strips 15. The movement of the belt is from right to left, as indicated by the arrow 22. Each of the spindle assemblies includes an adjustable member 20 connected at one end to a shaft 18 and at the other end to a crank shaft unit 21 which is rigidly mounted in the press frame. Hence, each support strip is adjusted at both ends by a crank, not shown, so that the wedge units of each support strip are set precisely with respect to each other. After that initial adjustment, the spindle assemblies of each support strip are operated simultaneously during normal operation. In this embodiment, there are three support strips along each side of the pressure plate and they are also positioned in alignment as indicated by the dotted lines 23.

Figures 3, 4:
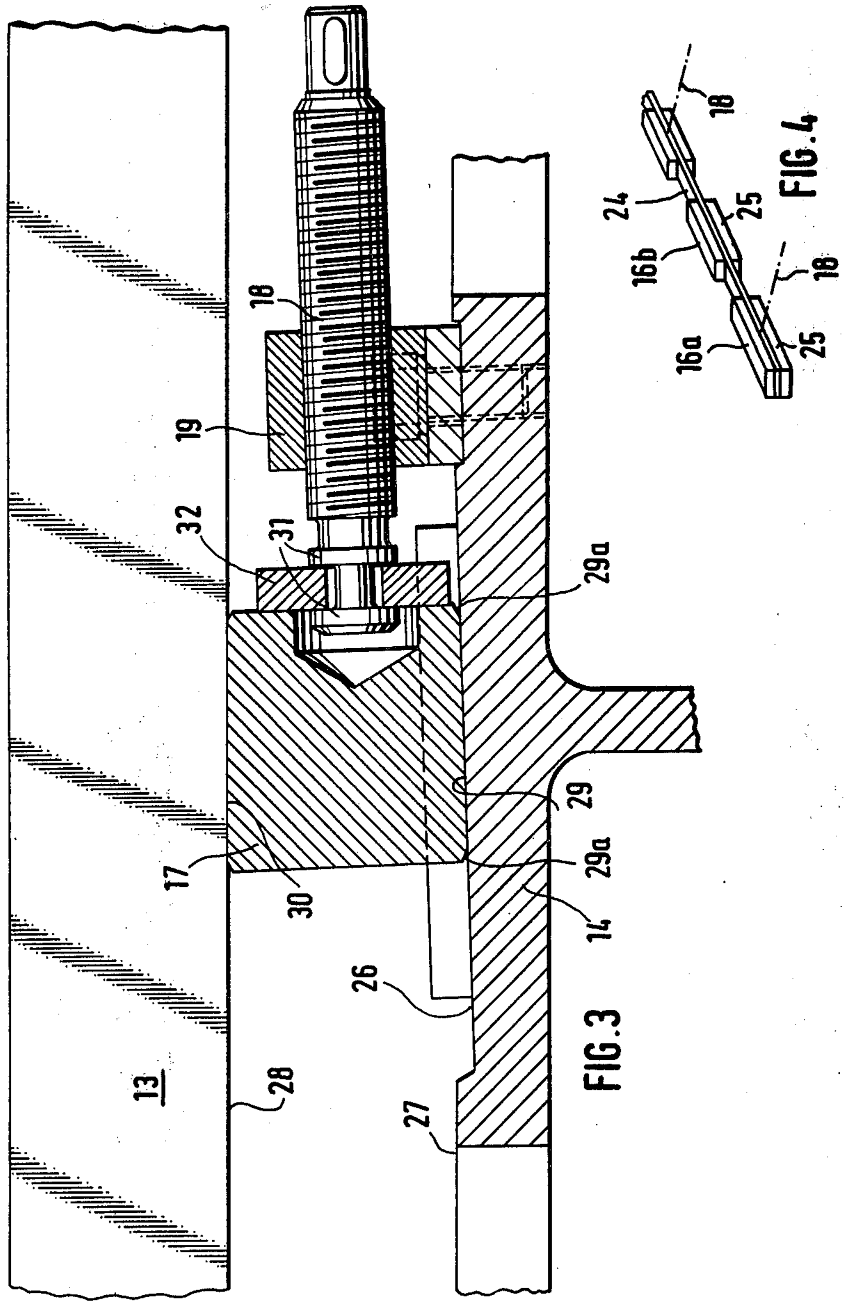
FIG. 3 is an enlarged sectional view on the line 3—3 of FIG. 2; and, FIG. 4 is a perspective view of another embodiment of the movable support strip structure in a press of the type of that of FIGS. 1 to 3.

Another embodiment of the support strips is shown in FIG. 4. A plurality of support strip portions 16*a'*, 16*b'* and others are provided. There is a center steel strip 24 to which are welded steel blocks 25. The resulting construction comprises a continuous series of support strips which are shaped and operative the same as support strips 16 and 17. With some constructions, the entire assembly of FIG. 4 can be adjusted by as few as two assemblies of the type described above.

As indicated above, the construction and operation of the press, including the components shown but not identified, are in accordance with the prior art. As shown in the upper portion of FIG. 1, the return run 5*a* is supported upon rollers 6, and the return run 11*a* of the lower belt extends along the base of the press. The upper and lower press frames are rigidly supported in precisely-controlled relationship, and the upper press frame with its associated parts is lifted when desirable by hydraulic units 3. It should be noted that the rollers between the pressure plates and the belts are turned by the belts and are thereby rolled longitudinally through the treatment zone. The pressure plates may also act as heating or cooling plates.

The present invention overcomes the difficulties discussed above with respect to variations in the thickness of the sheet material which is produced in prior presses. Precise control of product thickness is provided transversely and longitudinally of the treatment zone. The invention contemplates that variations can be made in the illustrative embodiment and that other embodiments may be provided, all within the scope of the claims which follow.

What is claimed is:

1. In a twin-belt press which has two endless steel belts with coextensive belt runs which form a treatment zone therebetween, means to support said belt runs in predetermined spaced relationship including, a pressure plate structure which presents a surface which determines the position and contour of one of said belt runs, a second pressure plate structure which presents a surface which determines the position and contour of the other of said belt runs, means to provide rigid support for the longitudinal central portion of one of said pressure plate structures, and adjustable means to provide support for the respective longitudinal edge portions of said one of said pressure plate structures which includes means forming a wedge ramp extending toward said longitudinal central portion from adjacent one of said edge portions at an angle to a plane parallel to the desired plane of said belt runs and wedge means upon which a portion of said one of said pressure plate structure rests, said wedge means having a surface resting upon said ramp surface and mating therewith and means to adjust the position of said wedge means on said ramp surface whereby said portion of said one of said pressure plate structure is moved transversely of said desired plane.

2. The construction described in claim 1, wherein said means to adjust the position of said wedge means comprises a fixed bracket having a threaded bore therethrough and a threaded shaft within said bore and rotatably connected to said wedge means.

3. The construction described in either of claims 1 or 2, wherein there are two of said ramp surfaces and two of said wedge means as described, and means interconnecting said two wedge means.

4. The construction as described in claim 2, which includes means to turn said shaft.

5. The construction as described in claim 1, wherein said wedge means includes a central steel strip and strip means attached to said strip.

6. The construction as described in either of claims 1 or 2, wherein said adjustable means includes a plurality of wedge ramps and wedge means as described, positioned respectively along said longitudinal edge portions and operative to provide adjustable support means for said edge portions.

7. In a twin-belt press which has two endless steel belts with coextensive belt runs which form a treatment zone therebetween with parallel longitudinal side edges, means to support said belt runs in predetermined spaced relationship including, a pressure plate structure which presents a surface which determines the position and contour of one of said belt runs, a second pressure plate structure which presents a surface which determines the position and contour of the other of said belt runs, and adjustable means adjacent each of said side edges to provide support for the respective edge portion of one of said pressure plate structures which comprises support means positioned upon an oblique surface extending toward said longitudinal central portion from adjacent one of said edges, and means to move said support means along said surface to adjust the position of said edge portion transversely of the general plane of said treatment zone.

* * * * *